US008127249B2

(12) United States Patent
Deggelmann et al.

(10) Patent No.: US 8,127,249 B2
(45) Date of Patent: Feb. 28, 2012

(54) METHOD AND APPARATUS PROVIDING CONFIGURABLE POP-UPS

(75) Inventors: Martin Deggelmann, Waldorf (DE); Joachim Kenntner, Heidelberg (DE)

(73) Assignee: SAP AG, Walldorf (DE)

(*) Notice: Subject to any disclaimer, the term of this patent is extended or adjusted under 35 U.S.C. 154(b) by 310 days.

(21) Appl. No.: 11/517,124

(22) Filed: Sep. 6, 2006

(65) Prior Publication Data
US 2008/0059898 A1 Mar. 6, 2008

(51) Int. Cl.
*G06F 3/00* (2006.01)
*G06F 3/048* (2006.01)

(52) U.S. Cl. .................... 715/808; 715/752
(58) Field of Classification Search .............. 715/752, 715/808
See application file for complete search history.

(56) References Cited

U.S. PATENT DOCUMENTS

| 4,862,376 | A | * | 8/1989 | Ferriter et al. | 700/107 |
|---|---|---|---|---|---|
| 5,754,176 | A | * | 5/1998 | Crawford | 715/711 |
| 5,910,800 | A | * | 6/1999 | Shields et al. | 715/711 |
| 5,995,101 | A | * | 11/1999 | Clark et al. | 715/711 |
| 6,055,515 | A | * | 4/2000 | Consentino et al. | 705/27 |
| 6,828,988 | B2 | * | 12/2004 | Hudson et al. | 715/711 |
| 6,907,580 | B2 | * | 6/2005 | Michelman et al. | 715/856 |
| 7,030,889 | B2 | * | 4/2006 | Hamada et al. | 345/619 |
| 7,370,277 | B1 | * | 5/2008 | Canfield et al. | 715/752 |
| 7,409,646 | B2 | * | 8/2008 | VedBrat et al. | 715/815 |
| 2004/0095371 | A1 | * | 5/2004 | Haynes et al. | 345/711 |
| 2005/0028107 | A1 | * | 2/2005 | Gomes et al. | 715/762 |
| 2005/0050470 | A1 | * | 3/2005 | Hudson et al. | 715/711 |
| 2005/0289170 | A1 | * | 12/2005 | Brown et al. | 707/101 |

* cited by examiner

*Primary Examiner* — William Bashore
*Assistant Examiner* — David Phantana Angkool
(74) *Attorney, Agent, or Firm* — Kenyon & Kenyon LLP

(57) ABSTRACT

A method for configuring a pop-up that displays various types of information on a computer screen, includes providing a graphic user interface that displays a list of types of information capable of being displayed by the pop-up and providing a user configuration system that allows a user to configure the pop-up by selecting from the list of the types of information to be displayed by the pop-up.

24 Claims, 9 Drawing Sheets

METHOD AND APPARATUS PROVIDING CONFIGURABLE POP-UPS

BACKGROUND

1. Technical Field

The present disclosure relates generally to pop-ups and, more particularly, to a method and apparatus for providing configurable pop-ups.

2. Description of the Related Art

Pop-ups such as tooltips are text areas that are automatically displayed when a user moves the cursor over a predetermined area of a computer display. Pop-ups are used to provide information to a user when the cursor is moved over specific portions of a computer screen. For example, in a Microsoft Windows operating system environment, when the cursor is placed momentarily over a displayed icon such as an icon indicating a folder, information will pop up indicating a size of the information in the folder as well as a partial list of the names of the files in the folder. Another example of a tooltip can be seen by placing the cursor on an icon indicating a word processing document. A pop-up will display the title of the document, the type of document (WORD, Word Perfect, HTML, etc), the author of the document, a "date modified" indicating the date the document was last modified and a size of the document.

Although the present disclosure will be described primarily with respect to tooltips used in a Microsoft Windows type operating system, it will be appreciated that aspects of the present disclosure may be applied to any type of pop-up used in any type of operating system.

A user may have limited control over tooltips. For example, in a Windows operating system environment as shown in FIG. 1, one of the folder options (400) allows a user to set whether to show a pop-up (tooltip) description for folder and desktop items.

Although pop-ups can provide valuable information to the user, much of the information may be unnecessary or undesired. On the other hand, the pop-ups may not provide enough information and/or information that would be helpful to the user.

Accordingly, it would be beneficial if the user was able to indicate the specific type of information to be displayed by the pop-ups.

SUMMARY

This application describes tools (in the form of methodologies, apparatuses, and systems) for providing configurable pop-ups. The tools may be embodied in one or more computer programs stored on a computer readable medium or program storage device and/or transmitted in the form of a computer data signal in one or more segments via a computer network or other transmission medium.

A method for configuring a pop-up that displays various types of information on a computer screen, comprises providing a graphic user interface that displays a list of types of information capable of being displayed by the pop-up and providing a user configuration system that allows a user to configure the pop-up by selecting from the list of the types of information to be displayed by the pop-up.

An apparatus for configuring a pop-up that displays various types of information on a computer screen, comprises a graphic user interface that displays a list of types of information capable of being displayed by the pop-up and a user configuration system that allows a user to configure the pop-up by selecting from the list of the types of information to be displayed by the pop-up.

A computer readable storage medium including computer executable code for allowing a user to configure a pop-up that displays various types of information on a computer screen, comprises code for providing a graphic user interface that displays a list of types of information capable of being displayed by the pop-up and code for providing a user configuration system that allows a user to configure the pop-up by selecting from the list of the types of information to be displayed by the pop-up.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The following exemplary embodiments are set forth to aid in an understanding of the subject matter of this disclosure, but are not intended, and may not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 8:
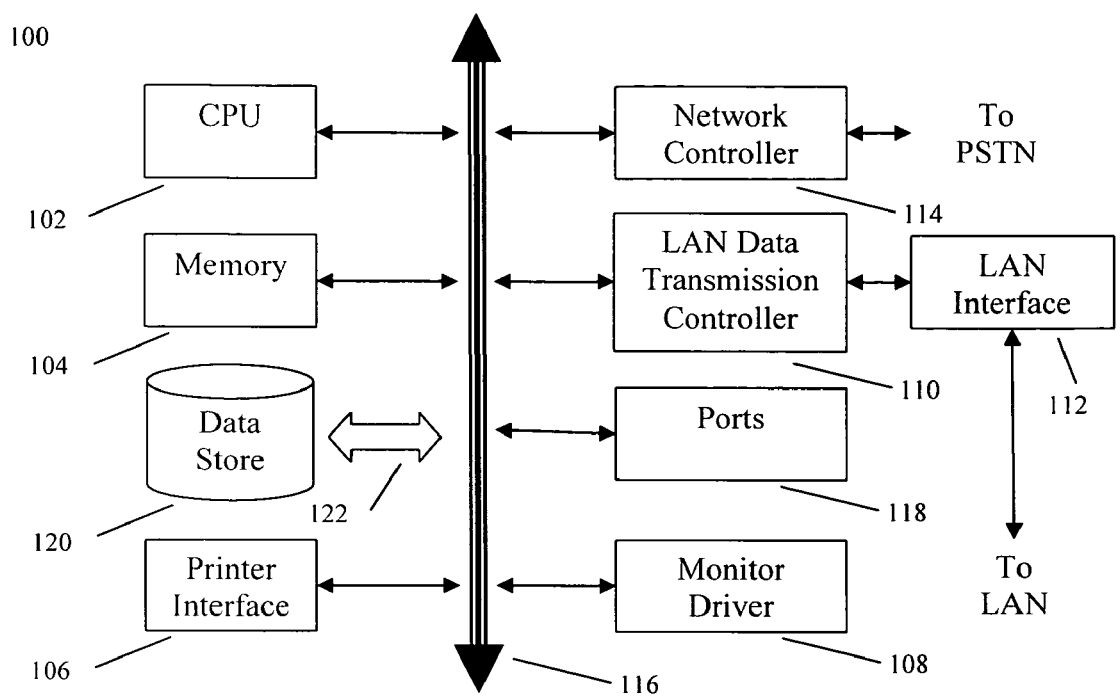
FIG. 8 shows a block diagram of an exemplary computer system capable of implementing the method and system of the present disclosure.

FIG. 8 shows an example of a computer system 100 which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

The computer system 100 is merely exemplary. The specific embodiments described herein are illustrative, computer system(s) as referred to herein may include(s) individual computers, servers, computing resources, networks, etc., and many variations can be introduced on these embodiments without departing from the spirit of the disclosure or from the scope of the appended claims.

Various types of information can be displayed by a tooltip when a cursor is placed over a specific portion of a screen. For example, in a Microsoft Windows operating system environment, pop-ups referred to as tooltips are displayed when a cursor is placed over specific icons for a fixed period of time. Different tooltips will display different types of information, depending on the icon involved. For example, a tooltip for an icon representing a word processing document such as Microsoft WORD will display different information than a tooltip for an icon representing a file of documents. However, the user has no real control over what information is otherwise displayed. Embodiments of the present disclosure let a user configure pop-ups such as tooltips, thus allowing they user to control what information is to be displayed.

Figure 1:
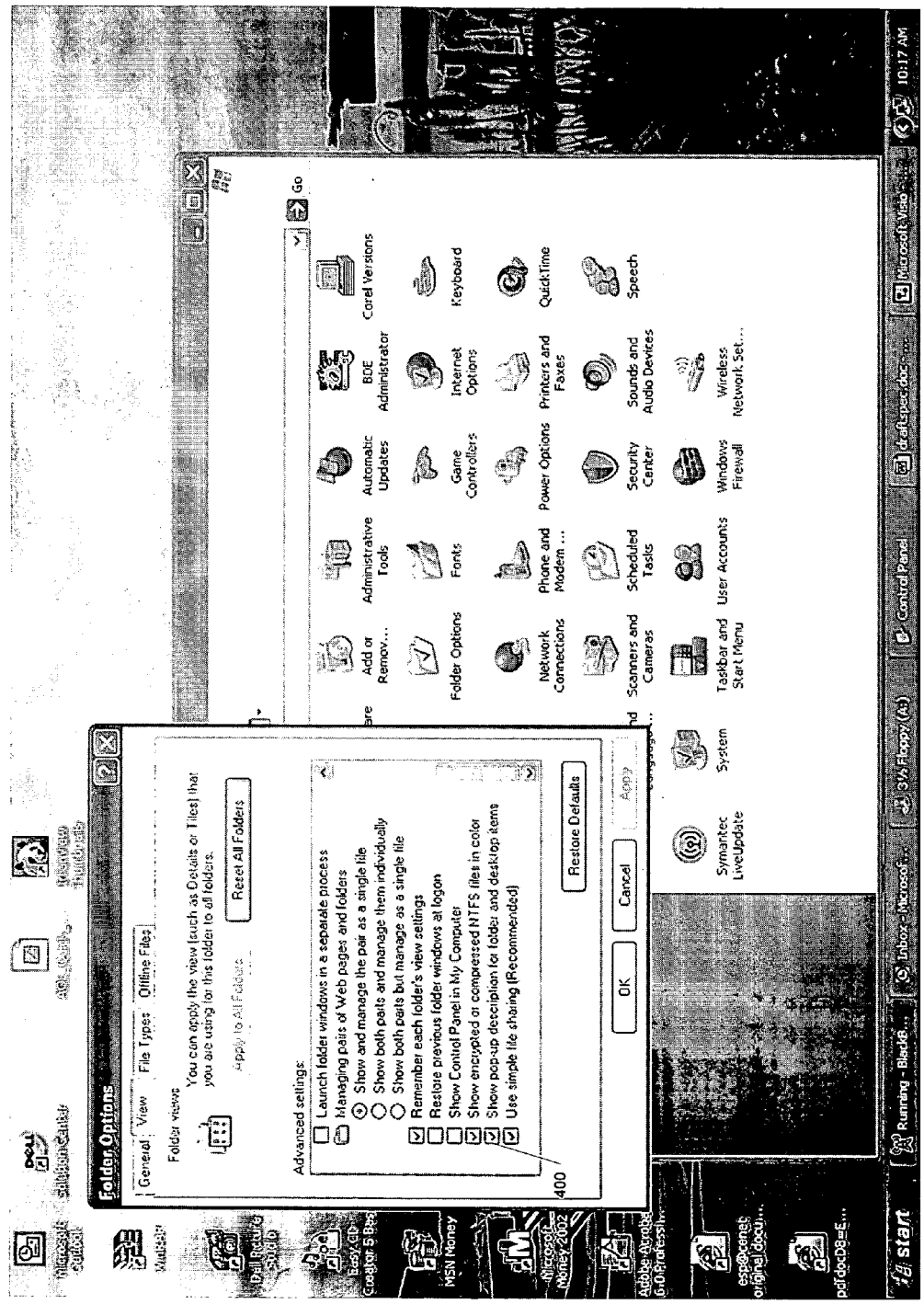
FIG. 1 shows a view of a Window showing a pop-up control according to the background art.
Figure 2A:
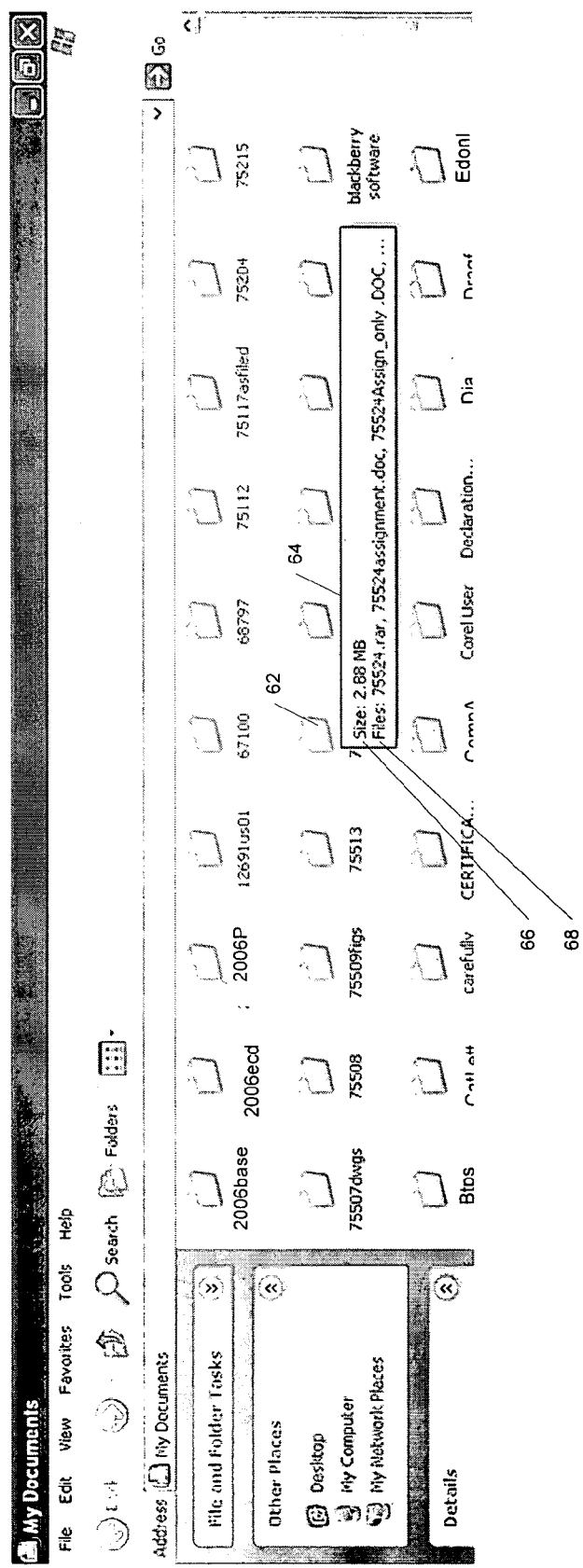
FIGS. 2A and 2B show views of information displayed by a pop-up.

FIG. 2A shows an example of the information displayed by default in a tooltip 64 for an icon representing a file 62. The information in tooltip 64 will be displayed, unless the information to be displayed is modified by the user as described below. By default, the tooltip 64 displays the size of the file 66 in bytes and the names 68 of the documents and/or files within the file 62. Of course depending on, for example, the operating system used the tooltip may include additional and/or different default information than that shown in FIG. 2A.

Figure 3:
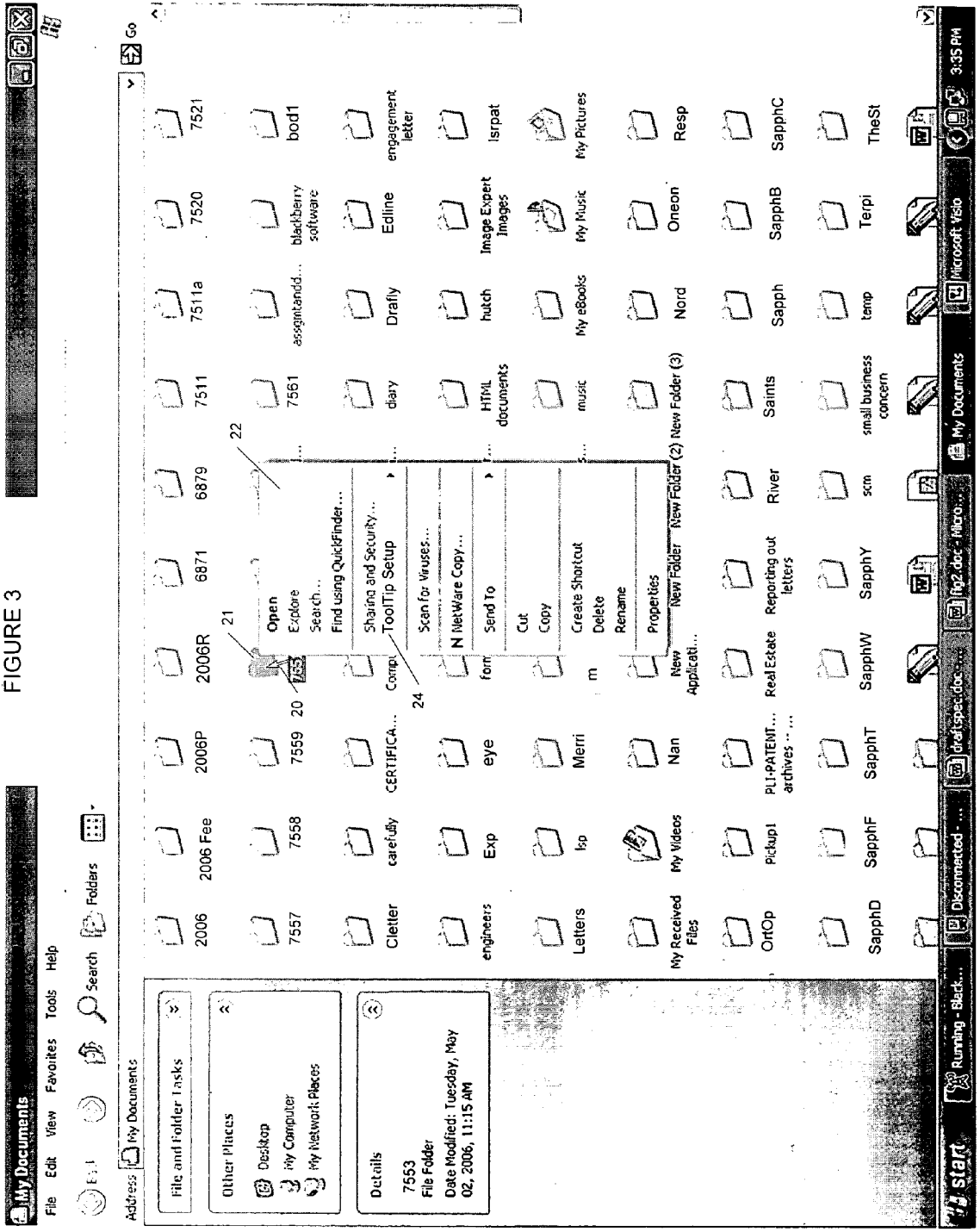
FIG. 3 shows a view of a control window including a tooltip setup option according to an embodiment of the present disclosure.
Figure 4:
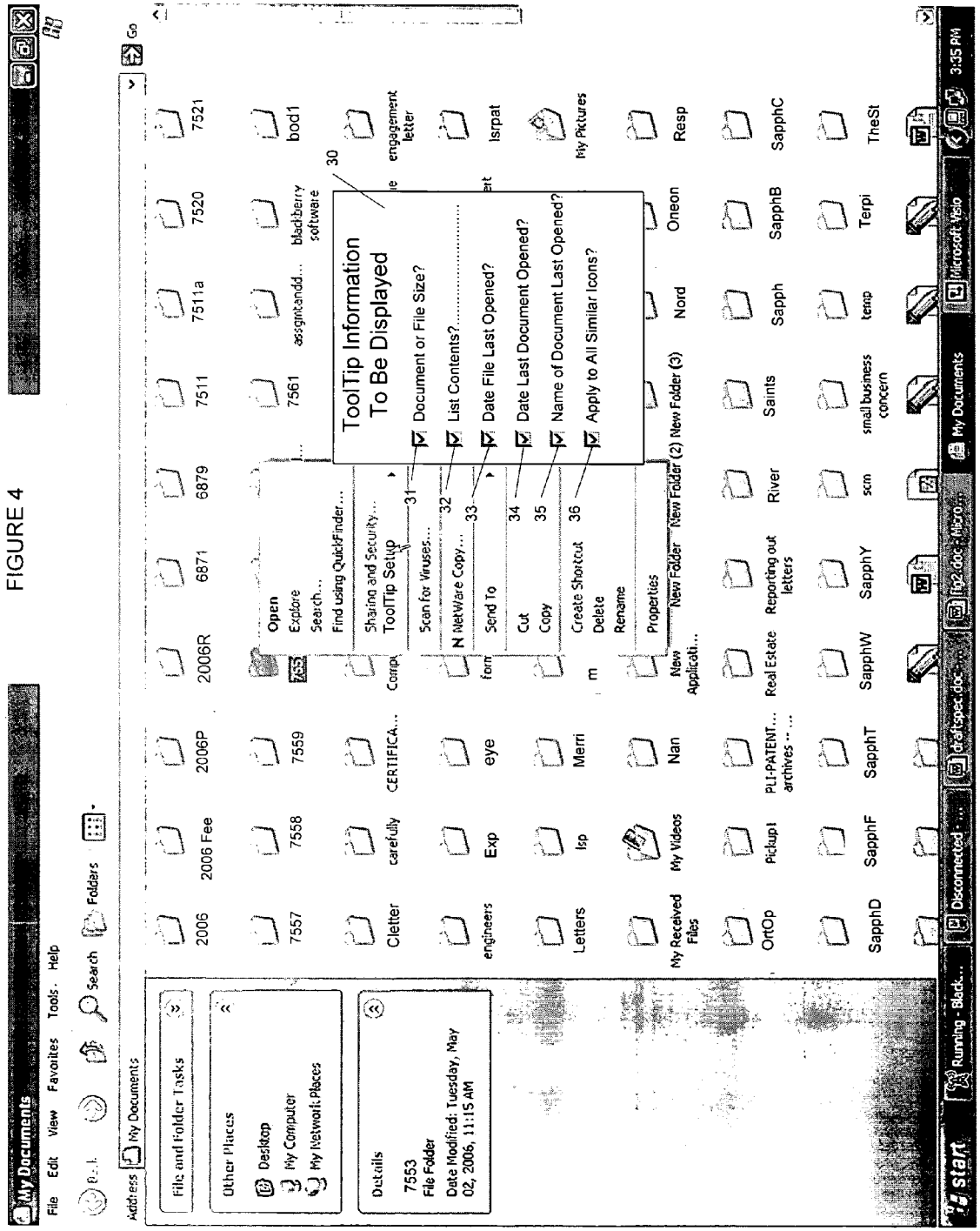
FIG. 4 shows a view of a control window for configuring a tooltip according to an embodiment of the present disclosure.

According to an embodiment of the present disclosure, the user can configure the tooltip to specify what information will be presented. As shown in FIG. 3, moving a cursor 20 over an icon representing a file 21 and right clicking on it causes a list of options 22 to be displayed. According to an embodiment of the present disclosure, these options include a ToolTip Setup option 24. Double clicking on the Tooltip Setup option 24 displays a box 30 entitled "ToolTip Information to be Displayed" as shown in FIG. 4. According to an embodiment of the present disclosure, the user is presented with various types of information that can be displayed when the cursor is placed on that icon. According to an embodiment of the present disclosure by default all information is displayed and, accordingly, each of boxes 31-36 are initially checked. The user can then configure the tooltip as desired to select what information, if any, is to be displayed by checking or unchecking the appropriate boxes 31-36. Of course, the system can be arranged so that none of the boxes 31-36 are initially checked so that by default, no information is displayed by the tooltip.

Figure 5:
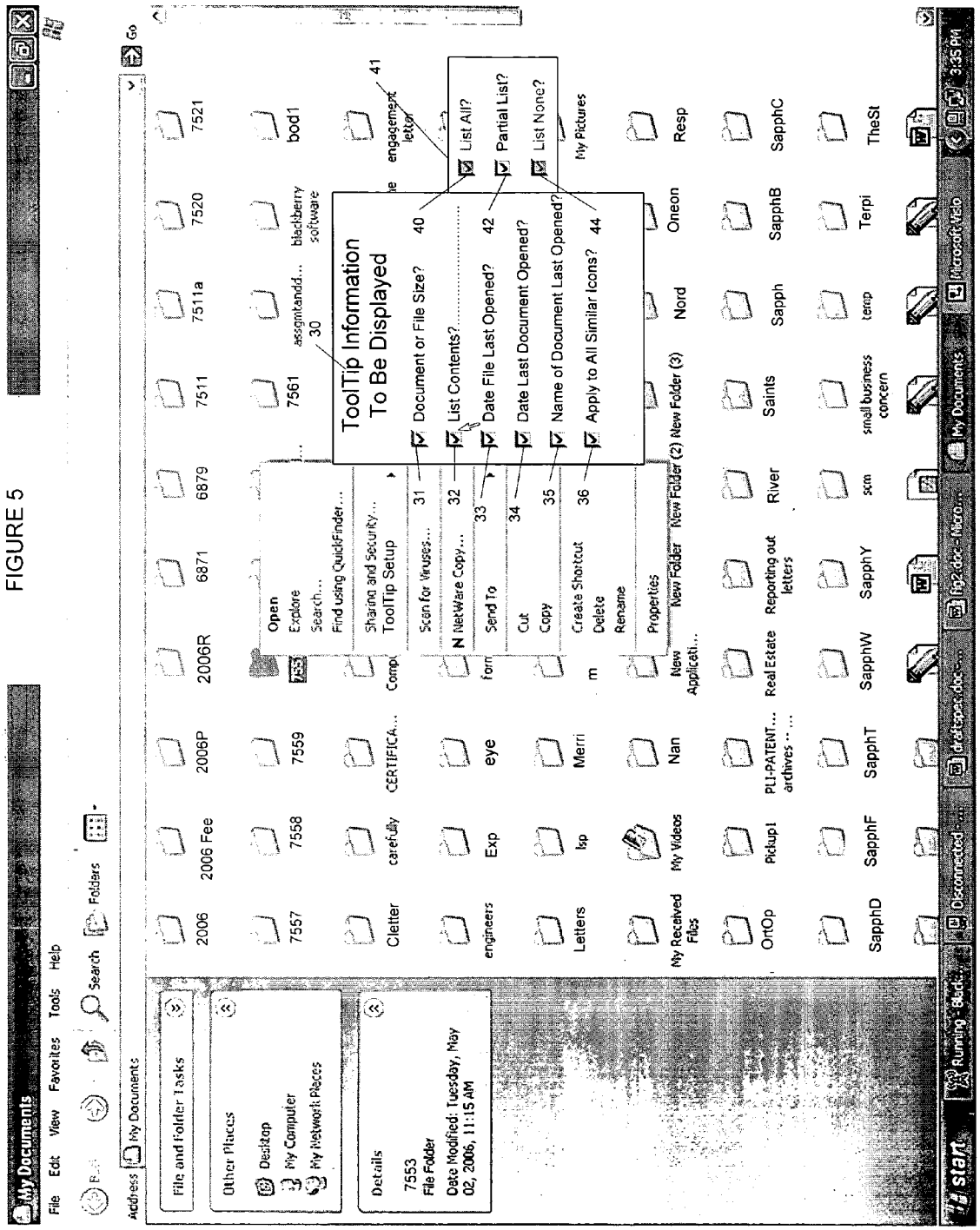
FIG. 5 shows another view of a control window for configuring a tooltip according to an embodiment of the present disclosure.

According to this embodiment of the present disclosure, by checking box 31 the user can have the size of the file displayed in the tooltip. Checking box 33, the user can have the date the file was last opened displayed. Checking box 35, the user can have the name of the last document in the file that was last opened displayed and checking box 34 the user can have the date that document was last opened displayed. Unless box 36 is checked, the selected information will be displayed only for this particular icon. Checking box 36 will display the selected information for all similar icons. For example, according to this embodiment if box 36 is checked, moving the cursor over any file icon will display the selected information. Checking box 32 allows the user to select whether any or all of the names of the documents in the file will be displayed. Upon checking box 32, a box 41 will be displayed as shown in FIG. 5 allowing the user to set whether some, all or none of the names of the documents in the file will be displayed in the tooltip. For example, checking box 40 will display a list of names of all documents. Checking box 44 will display none of the names of the documents. Checking box 42 will display a partial list of the names of the documents. For example, according to an embodiment of the present disclosure, checking box 42 will list the names of the first five documents in the file.

Figure 2B:
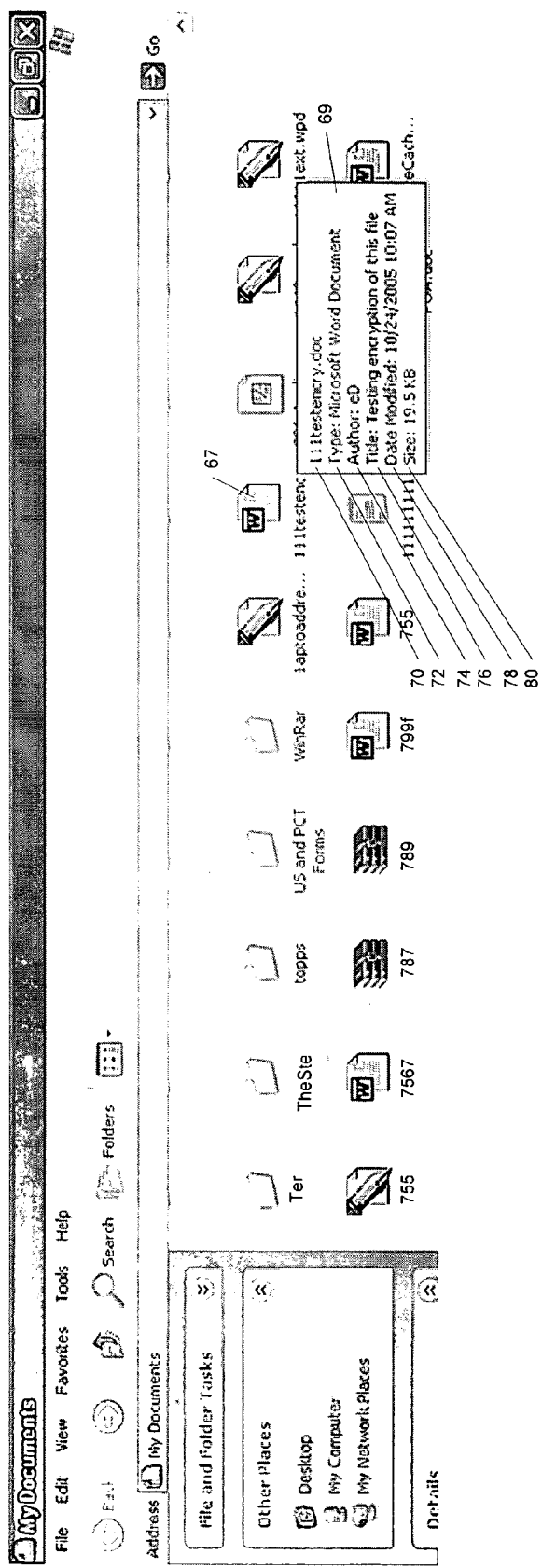

Different information may be displayed by tooltips for different icons. FIG. 2B shows an example of the information displayed by default in a tooltip 69 for an icon 67 representing a Microsoft WORD document. The information in tooltip 69 will be displayed, unless the information to be displayed is modified by the user as described below. By default, the tooltip 69 displays the name of the document 70, the type of document 72, the author 74, the title 76, the date the document was last modified 78 and the size of the document 80. Depending on the user's preference, it may be desirable that only some or none of this information be displayed by the tooltip.

Figure 6:
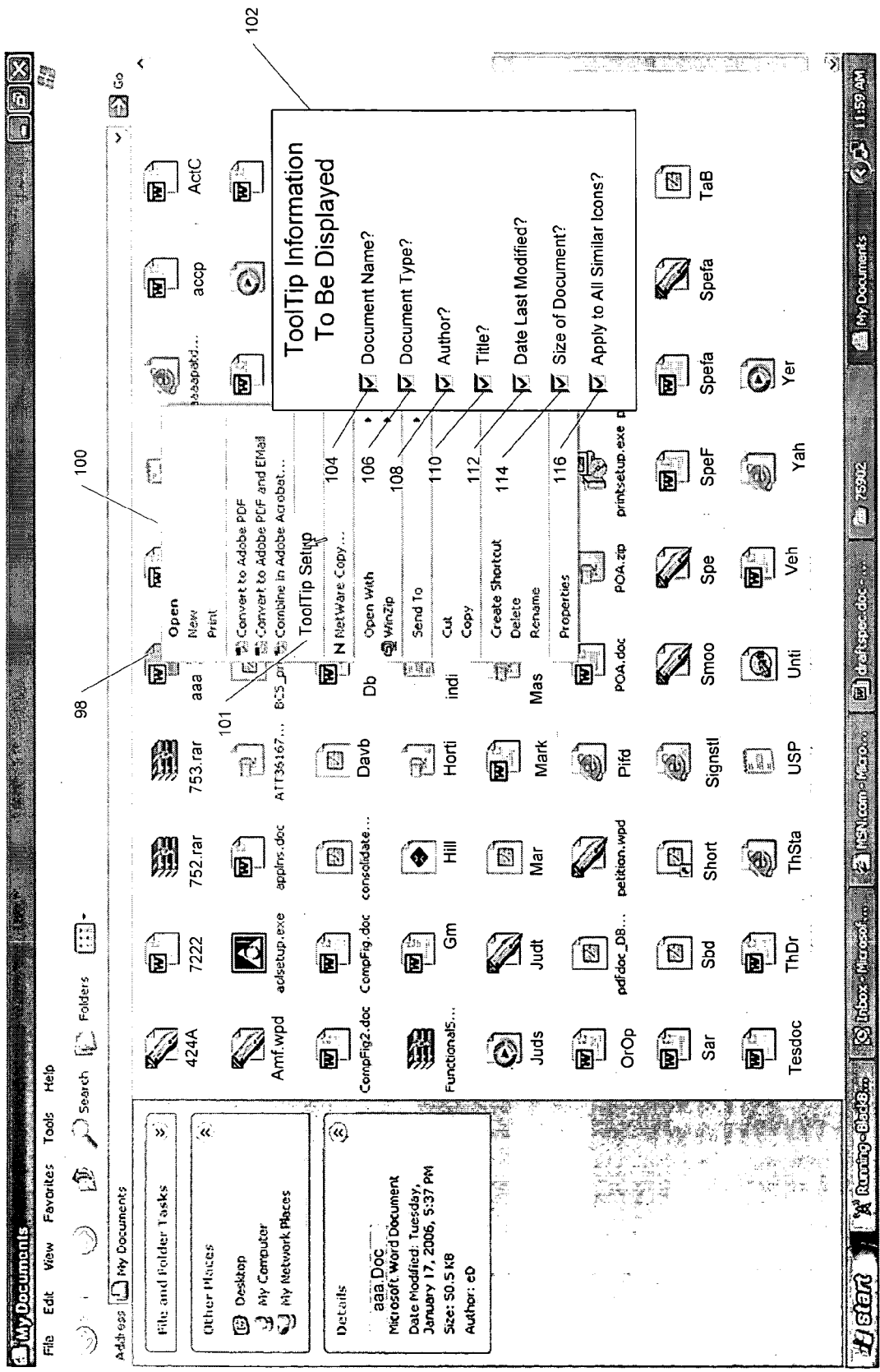
FIG. 6 shows a view of a control window for configuring a tooltip according to an embodiment of the present disclosure.

According to an embodiment of the present disclosure, the user can configure the tooltip to specify what information will be presented. Referring now to FIG. 6, moving a cursor over an icon 98 representing a Microsoft WORD document and right clicking on it causes a list of options 100 to be displayed. According to an embodiment of the present disclosure, these options include a ToolTip Setup option 101. Double clicking on the Tooltip Setup option 101 displays a box 102 entitled "ToolTip Information to be Displayed." According to an embodiment of the present disclosure, the user is presented with various types of information that can be displayed when the cursor is placed on that icon.

Checking box 104, the user can have the name of the document displayed. Checking box 106 will display the type of document (e.g., Microsoft WORD document). Checking box 108 will display the name of the author of the document. Checking box 110 will display the title of the document. Checking box 112 will display the date the document was last modified. Checking box 114 will display the size of the document. Unless box 116 is checked, the selected information will be displayed only for this particular icon. Checking box 116 will display the selected information for all similar icons. For example, according to this embodiment if box 116 is checked, moving the cursor over any Microsoft WORD document icon will display the selected information.

Figure 7:
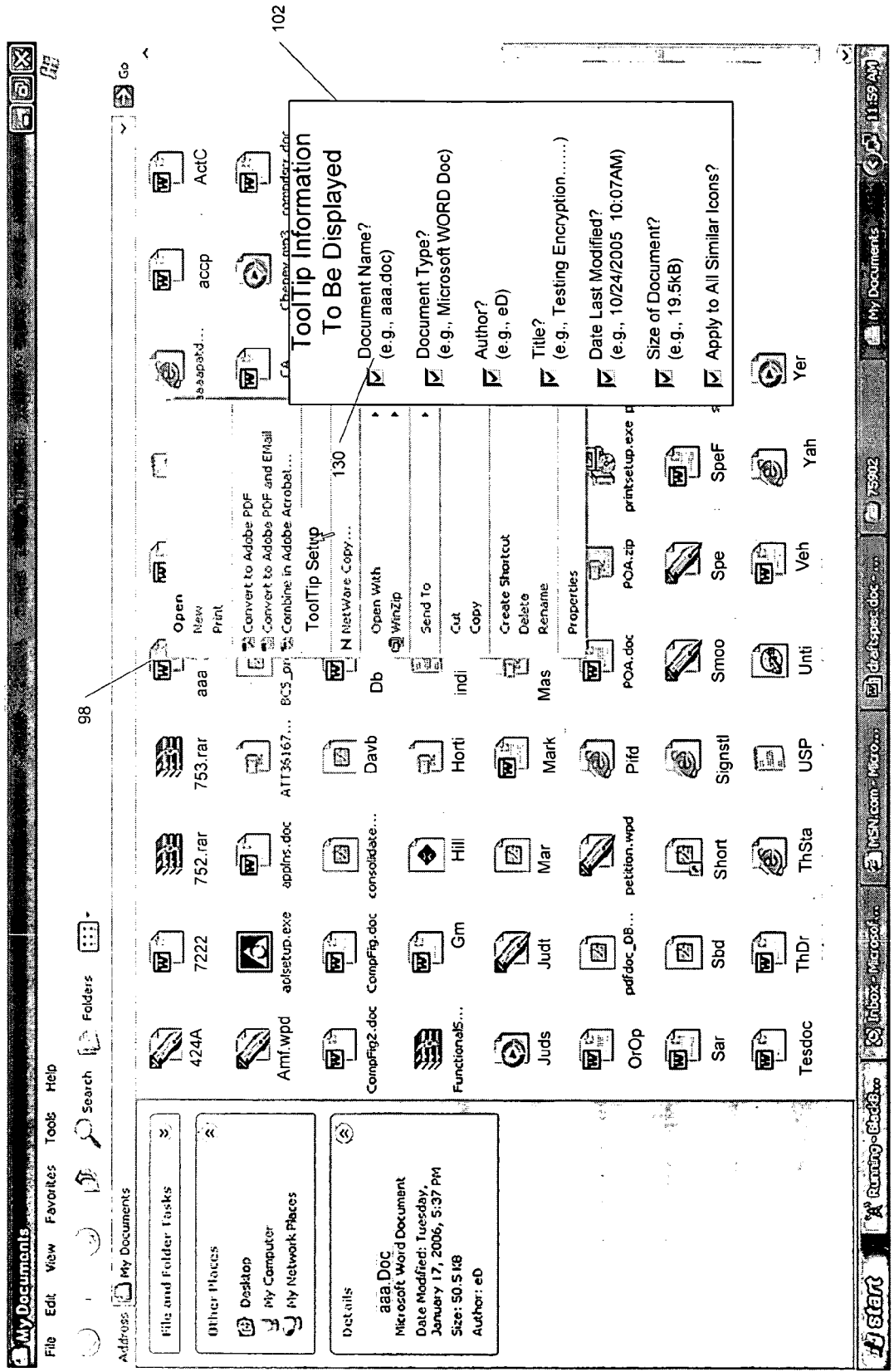
FIG. 7 shows a view of a control window for configuring a tooltip according to an embodiment of the present disclosure.

According to another embodiment of the present disclosure, information can be displayed to give the user an even better idea of what the information that can be displayed will look like. As shown in FIG. 7, examples of information that will be displayed can be shown to the user in box 102. For example, below "Document Name" 130 the name of the actual document (e.g., aaa.doc) or the name of a fictional exemplary document (e.g., Exdocument.doc) can be displayed.

It will be appreciated that aspects of the present disclosure can be applied to any type of pop-up that displays information to a user including tooltips as described above.

The present system can be implemented in digital electronic circuitry, or in computer hardware, firmware, software, or in combinations of them. The system can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the present system can be performed by one or more programmable processors executing a computer program to perform functions of the invention by operating on input data and generating output. Method steps can also be performed by, and apparatus of the disclosure can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; CD-ROMs (Compact Disc Read-only Memory) and DVD-ROMs (Digital Versatile Disc Read-only Memory). The processor and the memory can be supplemented by, or incorporated in special purpose logic circuitry.

To provide for interaction with a user, the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present system can be implemented in a computing system that includes a back-end component, e.g., as a data server, or that includes a middle-ware component, e.g., an application server, or that includes a front-end component, e.g., a client computer having a graphical interface or a Web browser through which a user can interact with an implementation of the present disclosure, or any combination of such back-end, middleware, or front-end components. The components of the computing system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The present system has been described in terms of particular embodiments. Other embodiments are within the scope of the following claims. For example, although the present system has been described as a component in a larger system, it can also be implemented in other systems or as a stand-alone system.

Numerous additional modifications and variations of the present disclosure are possible in view of the above-teachings. It is therefore to be understood that within the scope of the appended claims, the present disclosure may be practiced other than as specifically described herein. For example, elements and/or features of different illustrative embodiments may be combined with each other and/or substituted for each other within the scope of this disclosure and appended claims.

What is claimed is:

1. A method for configuring a pop-up that displays various types of information on a computer screen, comprising:
    displaying, on a graphic user interface, at least one icon;
    in response to an activation with respect to an icon by a user, displaying actions associated with the icon;
    in response to a user selection of a popup setup action, displaying on the graphic user interface a list of all of the types of information capable of being displayed by the pop-up, the list of all of the types of information including a list of types of default information displayed by the pop-up, the displayed list including user selectable inputs that allow the user to select or deselect information to be displayed from the list; and
    in response to the user selection, pre-configuring the types of information to be displayed by the pop-up.

2. The method of claim 1, wherein the pop-up comprises a tooltip.

3. The method of claim 1, wherein the list of all of the types of information comprises at least one of document name, document type, author, title, date last modified and size of document.

4. The method of claim 3, wherein the pop-up is automatically displayed on the computer screen in response to a pointer being placed on the icon.

5. The method of claim 4, wherein the list comprises an option allowing the user to select whether the selected types of information will be displayed for all similar icons.

6. The method of claim 1, wherein the list of all of the types of information comprises at least one of a size of a file and at least one name of a file.

7. The method of claim 6, wherein the pop-up is automatically displayed on the computer screen in response to a pointer being placed on the icon.

8. The method of claim 7, wherein the list comprises an option allowing the user to select whether the selected types of information will be displayed for all similar icons.

9. A programmed computer apparatus having computer executable code for configuring a pop-up that displays various types of information on a computer screen, said computer executable code comprising:
    code for displaying, on a graphic user interface, at least one icon;
    code for, in response to an activation with respect to an icon by a user, displaying actions associated with the icon;
    code for in response to a user selection of a popup setup action, displaying on the graphic user interface a list of all of the types of information capable of being displayed by the pop-up, the of types of information list including a list of all of the types of default information displayed by the pop-up, the displayed list including user selectable inputs that allow the user to select or deselect information to be displayed from the list; and code for in response to the user selection, pre-configuring the types of information to be displayed by the pop-up.

10. The apparatus of claim 9, wherein the pop-up comprises a tooltip.

11. The apparatus of claim 9, wherein the list of all of the types of information comprises at least one of document name, document type, author, title, date last modified and size of document.

12. The apparatus of claim 11, wherein the pop-up is automatically displayed on the computer screen in response to a pointer being placed on the icon.

13. The apparatus of claim 12, wherein the list comprises an option allowing the user to select whether the selected types of information will be displayed for all similar icons.

14. The apparatus of claim 9, wherein the list of all of the types of information comprises at least one of a size of a file and at least one name of a file.

15. The apparatus of claim 14, wherein the pop-up is automatically displayed on the computer screen in response to a pointer being placed on the icon.

16. The apparatus of claim 15, wherein the list comprises an option allowing the user to select whether the selected types of information will be displayed for all similar icons.

17. A computer readable storage medium including computer executable code for allowing a user to configure a pop-up that displays various types of information on a computer screen, comprising:

code for displaying, on a graphic user interface, at least one icon;

code for, in response to an activation with respect to an icon by a user, displaying actions associated with the icon;

code for in response to a user selection of a pomp setup action, displaying on the graphic user interface a list of all of the types of information capable of being displayed by the pop-up, the of types of information list including a list of all of the types of default information displayed by the pop-up, the displayed list including user selectable inputs that allow the user to select or deselect information to be displayed from the list; and code for in response to the user selection, pre-configuring the types of information to be displayed by the pop-up.

18. The computer readable storage medium of claim 17, wherein the pop-up comprises a tooltip.

19. The computer readable storage medium of claim 17, wherein the list of all of the types of information comprises at least one of document name, document type, author, title, date last modified and size of document.

20. The computer readable storage medium of claim 19, further comprising code for automatically displaying the pop-up on the computer screen in response to a pointer being placed on the icon.

21. The computer readable storage medium of claim 19, wherein the list comprises an option allowing the user to select whether the selected types of information will be displayed for all similar icons.

22. The computer readable storage medium of claim 17, wherein the list of all of the types of information comprises at least one of a size of a file and at least one name of a file.

23. The computer readable storage medium of claim 22, further comprising code for automatically displaying the pop-up on the computer screen in response to a pointer being placed on the icon.

24. The computer readable storage medium of claim 23, wherein the list comprises an option allowing the user to select whether the selected types of information will be displayed for all similar icons.

* * * * *